US012307733B2

(12) United States Patent
LeGendre et al.

(10) Patent No.: US 12,307,733 B2
(45) Date of Patent: May 20, 2025

(54) LEARNING ILLUMINATION FROM DIVERSE PORTRAITS

(71) Applicant: Google LLC, Mountain View, CA (US)

(72) Inventors: Chloe LeGendre, Culver City, CA (US); Paul Debevec, Culver City, CA (US); Wan-Chun Ma, Culver City, CA (US); Rohit Pandey, Mountain View, CA (US); Sean Ryan Francesco Fanello, San Francisco, CA (US); Christina Tong, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 516 days.

(21) Appl. No.: 17/309,171

(22) PCT Filed: Sep. 21, 2020

(86) PCT No.: PCT/US2020/070558
§ 371 (c)(1),
(2) Date: May 3, 2021

(87) PCT Pub. No.: WO2021/236175
PCT Pub. Date: Nov. 25, 2021

(65) Prior Publication Data
US 2022/0027659 A1 Jan. 27, 2022

Related U.S. Application Data (60) Provisional application No. 62/704,657, filed on May 20, 2020.

(51) Int. Cl.
*G06V 10/60* (2022.01)
*G06F 18/214* (2023.01)
(Continued)

(52) U.S. Cl.
CPC ............ *G06V 10/60* (2022.01); *G06F 18/214* (2023.01); *H04N 23/611* (2023.01); *H04N 23/741* (2023.01)

(58) Field of Classification Search
CPC ...... G06V 10/60; G06V 10/82; G06V 10/454; G06V 20/00; G06V 20/20; G06V 20/64;
(Continued)

(56) References Cited

U.S. PATENT DOCUMENTS 9,860,453 B2 * 1/2018 Matthews .............. H04N 23/71
10,540,812 B1 * 1/2020 Yildiz ..................... G06T 15/50
(Continued)

FOREIGN PATENT DOCUMENTS

CN 104952063 A 9/2015
CN 111133440 A 5/2020
(Continued)

OTHER PUBLICATIONS

International Search Report and Written Opinion for PCT Application No. PCT/US2020/070558, dated Mar. 22, 2021, 15 pages.
(Continued)

*Primary Examiner* — Michael S Osinski
(74) *Attorney, Agent, or Firm* — Brake Hughes Bellermann LLP (57) ABSTRACT

Techniques of estimating lighting from portraits includes generating a lighting estimate from a single image of a face based on a machine learning (ML) system using multiple bidirectional reflection distribution functions (BRDFs) as a loss function. In some implementations, the ML system is trained using images of faces formed with HDR illumination computed from LDR imagery. The technical solution includes training a lighting estimation model in a supervised manner using a dataset of portraits and their corresponding ground truth illumination.

21 Claims, 6 Drawing Sheets

(51) Int. Cl.
*H04N 23/611* (2023.01)
*H04N 23/741* (2023.01)

(58) Field of Classification Search
CPC .... G06V 40/166; G06V 10/12; G06F 18/214; G06F 18/2148; G06F 18/24143; H04N 23/611; H04N 23/741; G06T 15/506; G06T 2207/20084; G06T 2207/20081; G06T 15/50; G06T 2207/20208; G06T 19/006; G06T 2207/30201; G06T 19/20; G06T 7/50; G06T 7/70; G06N 3/045; G06N 3/08; G06N 3/04; G06N 3/047; G06N 3/048; G06N 3/084; G06N 3/088
See application file for complete search history.

(56) References Cited

U.S. PATENT DOCUMENTS

| | | | |
|---|---|---|---|
| 10,936,909 B2* | 3/2021 | Sunkavalli | G06F 18/24 |
| 10,979,640 B2* | 4/2021 | Hold-Geoffroy | G06F 18/24143 |
| 11,182,961 B2* | 11/2021 | Knorr | H04N 13/239 |
| 11,330,196 B2* | 5/2022 | Neofytou | H04N 23/71 |
| 11,461,592 B2* | 10/2022 | Javidi | G06V 10/25 |
| 11,880,963 B2* | 1/2024 | Narukiyo | G06T 5/73 |
| 11,887,232 B2* | 1/2024 | Phan | G06N 3/0464 |
| 2009/0310828 A1 | 12/2009 | Kakadiaris et al. | |
| 2013/0121567 A1* | 5/2013 | Hadap | G06F 18/2134 345/426 |
| 2015/0261999 A1* | 9/2015 | Thiebot | G06V 10/143 348/222.1 |
| 2016/0150143 A1* | 5/2016 | Matthews | H04N 23/80 348/135 |
| 2017/0154462 A1* | 6/2017 | von Cramon | H04N 23/56 |
| 2018/0173980 A1* | 6/2018 | Fan | G06V 40/45 |
| 2018/0253865 A1* | 9/2018 | Price | G06N 3/084 |
| 2018/0253869 A1* | 9/2018 | Yumer | G06T 11/60 |
| 2018/0359416 A1* | 12/2018 | Hold-Geoffroy | G06V 10/764 |
| 2019/0057554 A1* | 2/2019 | Knorr | H04N 13/239 |
| 2019/0066369 A1* | 2/2019 | Peng | G06T 3/4053 |
| 2019/0164261 A1* | 5/2019 | Sunkavalli | G06T 7/90 |
| 2019/0340810 A1* | 11/2019 | Sunkavalli | G06T 15/506 |
| 2020/0082572 A1 | 3/2020 | Beeler et al. | |
| 2020/0151509 A1* | 5/2020 | Sunkavalli | G06V 10/82 |
| 2020/0186714 A1* | 6/2020 | Hold-Geoffroy | H04N 23/667 |
| 2020/0250799 A1* | 8/2020 | Nakada | G06V 40/16 |
| 2020/0273237 A1* | 8/2020 | Sunkavalli | G06N 20/00 |
| 2020/0288067 A1* | 9/2020 | Watazawa | G06V 10/60 |
| 2020/0410270 A1* | 12/2020 | Naruse | G06N 3/04 |
| 2021/0027526 A1* | 1/2021 | Dong | G06N 3/045 |
| 2021/0065440 A1* | 3/2021 | Sunkavalli | G06N 3/08 |
| 2021/0073955 A1* | 3/2021 | Zhang | G06T 5/92 |
| 2021/0256314 A1* | 8/2021 | Javidi | G06V 10/82 |
| 2021/0319252 A1* | 10/2021 | Ha | G06T 7/70 |
| 2021/0374402 A1* | 12/2021 | Kim | G06N 3/084 |
| 2021/0374902 A1* | 12/2021 | Chen | G06T 7/75 |
| 2021/0398344 A1* | 12/2021 | Pan | G06T 19/006 |
| 2022/0083795 A1* | 3/2022 | Zhang | G06V 40/16 |
| 2022/0207819 A1* | 6/2022 | Dmukhin | G06N 3/045 |
| 2024/0187559 A1* | 6/2024 | Li | G06V 10/60 |
| 2024/0408411 A1* | 12/2024 | Bert | A61N 5/1064 |
| 2024/0412451 A1* | 12/2024 | Deixler | G06T 15/506 |

FOREIGN PATENT DOCUMENTS

| | | |
|---|---|---|
| JP | 2019049706 A | 3/2019 |
| JP | 2019179464 A | 10/2019 |

OTHER PUBLICATIONS

Invitation to Pay Additional Fees and Partial International Search for PCT Application No. PCT/US2020/070558, dated Jan. 28, 2021, 9 pages.

Knorr, "Real-Time Illumination Estimation From Faces for Coherent Rendering", 2014 IEEE International Symposium on Mixed and Augmented Reality (ISMAR), Sep. 10-12, 2014, 10 pages.

Legendre, et al., "Deeplight: Learning Illumination for Unconstrained Mobile Mixed Reality", arxiv.org, Cornell University Library, Apr. 2, 2019, 11 pages.

Sun, et al., "Single Image Portrait Relighting", arxiv.org, Cornell University Library, XP081271657, May 2, 2019, 12 pages.

Communication pursuant to Rule 164(2)(b) and Article 94(3) EPC for European Application No. 20786421.6, dated Sep. 13, 2023, 10 pages.

Office Action for Korean Application No. 10-2022-7025292 (with English translation), dated Jul. 20, 2023, 12 pages.

Goldman, et al., "Shape and Spatially-Varying BRDFs From Photometric Stereo", Tenth IEEE International Conference on Computer Vision, ICCV 2005, vol. 1, Oct. 17-20, 2005, retrieved from: https://grail.cs.washington.edu/wp-content/uploads/2015/08/goldman-2005-sas.pdf, pp. 341-348.

Legendre, et al., "Learning Illumination from Diverse Portraits", SIGGRAPH Asia 2020 Technical Communications, Aug. 5, 2020, retrieved from: https://arxiv.org/pdf/2008.02396.pdf, XP093076586, pp. 1-14.

Nestmeyer, et al., "Learning Physics-Guided Face Relighting Under Directional Light", 2020 IEEE/CVF Conference on Computer Vision and Pattern Recognition (CVPR), retrieved from: https://arxiv.org/pdf/1906.03355.pdf, Apr. 19, 2020, pp. 5123-5132.

Zhou, et al., "Deep Single-Image Portrait Relighting", Proceedings of the IEEE/CVF International Conference on Computer Vision (ICCV), Oct. 2019, pp. 7194-7202.

First Office Action with English translation for Chinese Application No. 202080089261.9, mailed Aug. 24, 2024, 18 pages.

* cited by examiner

LEARNING ILLUMINATION FROM DIVERSE PORTRAITS

CROSS-REFERENCE TO RELATED APPLICATION

This application is a 35 U.S.C. § 371 National Phase Entry Application from PCT/US2020/070558, filed on Sep. 21, 2020, entitled "LEARNING ILLUMINATION FROM DIVERSE PORTRAITS", which claims the benefit of U.S. Provisional Patent Application No. 62/704,657, filed on May 20, 2020, entitled "LEARNING ILLUMINATION FROM PORTRAITS," the disclosures of which are incorporated by reference herein in their entirety.

TECHNICAL FIELD

This description relates to determining illumination from a portrait for use in, for example, augmented reality applications.

BACKGROUND

A problem in both still photos and video applications is to match the lighting of the real-world scene so that the rendered virtual content plausibly matches the appearance of the scene. For example, one may design a lighting scheme for an augmented reality (AR) use cases with world-facing cameras, as in the rear-facing camera of a mobile device, where somebody might want to render a synthetic object such as a piece of furniture into a live camera feed of a real-world scene.

SUMMARY

Implementations disclosed herein provide a learning-based technique for estimating high dynamic range (HDR), omnidirectional illumination from a single low dynamic range (LDR) portrait image captured under arbitrary indoor or outdoor lighting conditions. Such a technique includes training a model using portrait photos paired with their ground truth environmental illumination. The training includes generating a rich set of such photos by using a light stage to record the reflectance field and alpha matte of 70 diverse subjects in various expressions, then relighting the subjects using an image-based relighting with a database of one million HDR lighting environments, compositing the relit subjects onto paired high-resolution background imagery recorded during the lighting acquisition. The training of the lighting estimation model uses rendering-based loss functions and, in addition in some cases, a multi-scale adversarial loss to estimate plausible high frequency lighting detail. This learning-based technique reliably handles the inherent ambiguity between overall lighting strength and surface albedo, recovering a similar scale of illumination for subjects with diverse skin pigmentations. This technique further allows virtual objects and digital characters to be added to a portrait photograph with consistent illumination. This lighting estimation can run in real-time on a smartphone, enabling realistic rendering and compositing of virtual objects into live video for augmented reality (AR) applications.

In one general aspect, a method can include receiving image training data representing a plurality of images, each of the plurality of images including at least one of a plurality of human faces, each of the plurality of human faces having been formed by combining images of one or more faces as illuminated by at least one of a plurality of illumination sources in a physical or virtual environment, each of the plurality of illuminations sources having been situated at a respective orientation of a plurality of orientations within the physical or virtual environment. The method can also include generating a prediction engine based on the plurality of images, the prediction engine being configured to produce a predicted illumination profile from input image data, the input image data representing one input human face.

In another general aspect, a computer program product comprises a non-transitory storage medium, the computer program product including code that, when executed by processing circuitry of a computing device, causes the processing circuitry to perform a method. The method can include receiving image training data representing a plurality of images, each of the plurality of images including at least one of a plurality of human faces, each of the plurality of human faces having been formed by combining images of one or more faces as illuminated by at least one of a plurality of illumination sources in a physical or virtual environment, each of the plurality of illuminations sources having been situated at a respective orientation of a plurality of orientations within the physical or virtual environment. The method can also include generating a prediction engine based on the plurality of images, the prediction engine being configured to produce a predicted illumination profile from input image data, the input image data representing one input human face.

In another general aspect, an electronic apparatus comprises memory and controlling circuitry coupled to the memory. The controlling circuitry can be configured to receive image training data representing a plurality of images, each of the plurality of images including at least one of a plurality of human faces, each of the plurality of human faces having been formed by combining images of one or more faces as illuminated by at least one of a plurality of illumination sources in a physical or virtual environment, each of the plurality of illuminations sources having been situated at a respective orientation of a plurality of orientations within the physical or virtual environment. The controlling circuitry can also be configured to generate a prediction engine based on the plurality of images, the prediction engine being configured to produce a predicted illumination profile from input image data, the input image data representing one input human face.

The details of one or more implementations are set forth in the accompanying drawings and the description below. Other features will be apparent from the description and drawings, and from the claims.

DETAILED DESCRIPTION

One challenge in video applications such as augmented reality (AR) involves rendering a synthetic object into a real scene so that the object looks as if it is really in the scene. One problem is to match the lighting of the real-world scene so that the rendered virtual content plausibly matches the appearance of the scene. For example, one may design a lighting scheme for AR use cases with world-facing cameras, as in the rear-facing camera of a mobile device, where somebody might want to render a synthetic object such as a piece of furniture into a live camera feed of a real-world scene.

Such a lighting scheme designed for world-facing cameras, however, is likely going to be different from a lighting scheme designed for front-facing cameras, e.g., for selfie images. For example, in portrait photography, lighting influences the look and feel of a given shot. Photographers light their subjects to communicate a particular aesthetic sensibility and emotional tone. One approach used by film visual effects practitioners for capturing a real-world lighting scheme involves recording the color and intensity of omnidirectional illumination by photographing a mirror sphere using multiple exposures. A result of this conventional approach is an HDR "image-based lighting" (IBL) environment, used for realistically rendering virtual content into real-world photographs.

AR shares with film visual effects the goal of realistically blending virtual content and real-world imagery. In real-time AR, however, lighting measurements from specialized capture hardware are unavailable, as acquisition can be impractical for casual mobile phone or headset users. Similarly, for post-production visual effects in film, on-set lighting measurements are not always available, yet lighting artists must still reason about illumination using cues in the scene.

Accordingly, a challenge is to determine a lighting scheme for front-facing cameras given an image of a person's face within a lighting environment. Some concepts have leveraged the strong geometry and reflectance priors from faces to solve for lighting from portraits. In the years since some researchers have introduced portrait inverse lighting, most such techniques have sought to recover both facial geometry and a low frequency approximation of distant scene lighting, usually represented using up to a second-order spherical harmonic (SH) basis. The justification for this approximation is that skin reflectance is predominantly diffuse (Lambertian) and thus acts as a low-pass filter on the incident illumination. For diffuse materials, irradiance indeed lies very close to a nine-dimensional subspace well-represented by this basis.

Nevertheless, the lighting at capture-time may reveal itself not only through the skin's diffuse reflection, but also through the directions and extent of cast shadows and the intensity and locations of specular highlights. Inspired by these cues, some approaches train a neural network to perform inverse lighting from portraits, estimating omnidirectional HDR illumination without assuming any specific skin reflectance model. Such approaches may yield higher frequency lighting that can be used to convincingly render novel subjects into real-world portraits, with applications in both visual effects and AR when off-line lighting measurements are unavailable.

Conventional approaches to estimating lighting given a LDR image of a face include producing such a lighting estimate based on a modeled bidirectional reflection distribution function (BRDF) defining a relationship between incident light irradiance and reflected light radiance on the face. A BDRF may be expressed as a ratio of a differential of the light radiance, or power per unit solid angle about an incident ray direction per unit projected area normal to the ray, to a differential of outgoing light irradiance, or power per unit surface area.

A technical problem with the above-described conventional approaches to estimating lighting from an image of a face is that they base the lighting estimate on a single reflectance function, e.g., Lambertian or Phong models, which can limit the robustness of the lighting estimate in the presence as skin reflections are far more complex, involving sub-surface scattering, and asperity and Fresnel reflections, for example. in the presence of varied skin pigmentations. Furthermore, the inherent ambiguity between light source strength and surface albedo prevents the straightforward recovery of the correct scale of illumination for subjects of diverse skin tones, even if a straightforward Lambertian model could accurately predict skin reflection.

In accordance with the implementations described herein, a technical solution to the above-described technical problem includes generating a lighting estimate from a single image of a face based on a machine learning (ML) system using multiple bidirectional reflection distribution functions (BRDFs) as a loss function. In some implementations, the ML system is trained using images of faces formed with HDR illumination captured using an LDR lighting acquisition method. The technical solution includes training a lighting estimation model in a supervised manner using a dataset of portraits and their corresponding ground truth illumination. In an example dataset, 70 diverse subjects were photographed in a light stage system as illuminated by 331 directional light sources forming a basis on a sphere, such that the captured subject can be relit to appear as they would in any scene with image-based relighting. Although a few databases of real-world lighting environments captured using traditional HDR panoramic photography techniques are publicly available, the LDR lighting collection technique employed in some implementations has been extended to instead capture on the order of 1 million indoor and outdoor lighting environments, promoting them to HDR via a novel non-negative least squares solver formulation before using them for relighting.

A technical advantage of disclosed implementations is the ML system producing essentially the same lighting estimation at the correct scale or exposure value regardless of the skin pigmentation of the face in the input image. Any attempt at lighting estimation is complicated by an inherent ambiguity between surface reflectance (albedo) and light source strength. Stated otherwise, a pixel's shading is rendered unchanged if its albedo is halved while light source intensity doubles. The above-described improved techniques explicitly evaluate the performance of this model on a wide variety of subjects with different skin pigmentations. For a given lighting condition, the improved techniques can recover lighting at a similar scale for a variety of diverse subjects.

Further, the ML system can estimate HDR illumination even when trained on LDR portrait images generated using HDR illumination. A few recent works have sought to recover illumination from portraits without relying on a low frequency lighting basis or BRDF model, including deep learning methods for both arbitrary scenes and for only outdoor scenes containing the sun. The technical solution described herein outperforms both of these methods and generalizes to arbitrary indoor or outdoor scenes. These models rely on computer-generated humanoid models as training data, and so do not generalize as well to real, in-the-wild portraits at inference time.

Figure 1:
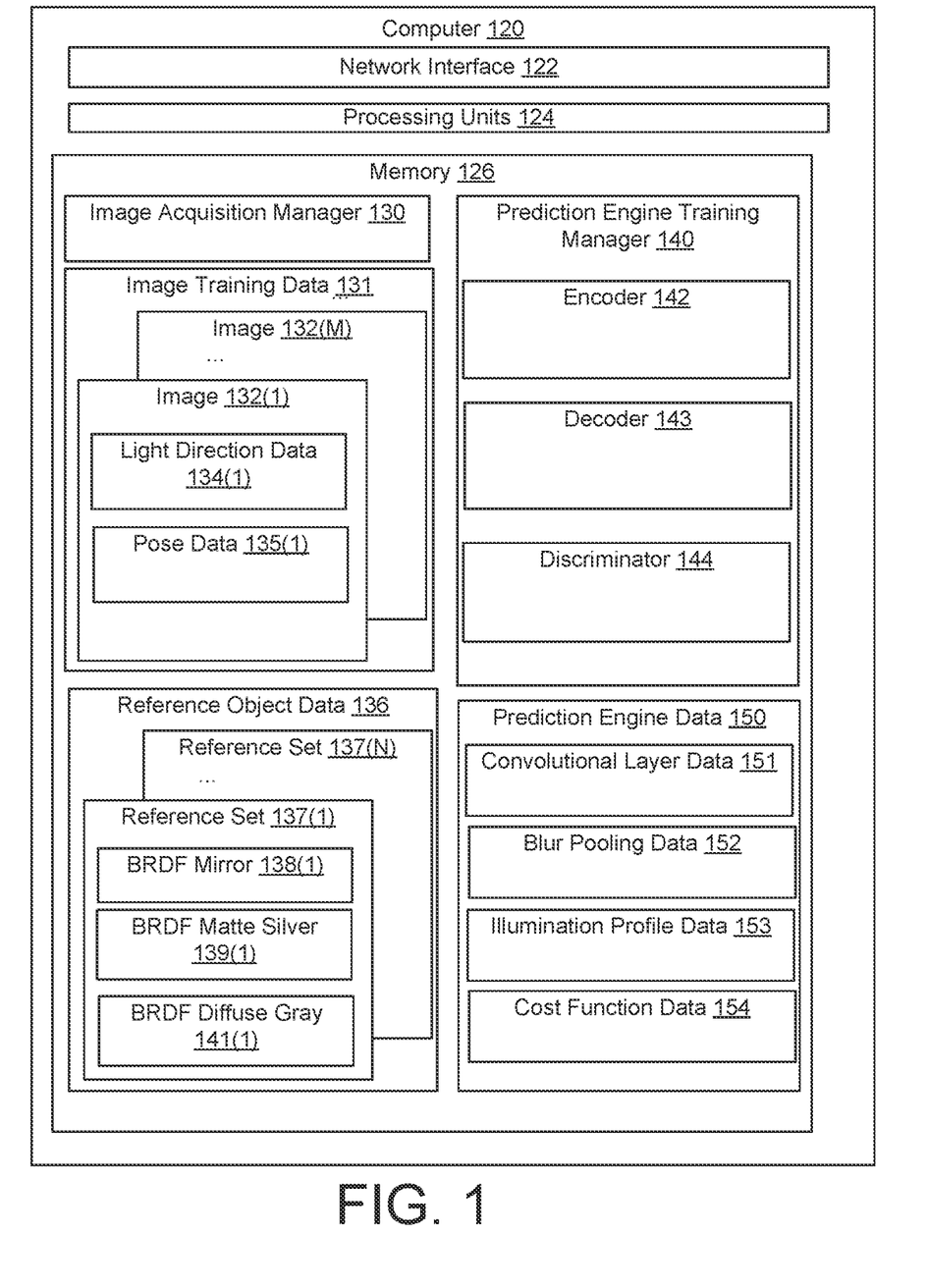
FIG. 1 is a diagram that illustrates an example electronic environment in which improved techniques described herein may be implemented.

FIG. 1 is a diagram that illustrates an example electronic environment 100 in which the above-described technical solution may be implemented. The computer 120 is configured to train and operate a prediction engine configured to estimate lighting from portraits.

The computer 120 includes a network interface 122, one or more processing units 124, and memory 126. The network interface 122 includes, for example, Ethernet adaptors, Token Ring adaptors, and the like, for converting electronic and/or optical signals received from the network 150 to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include an image acquisition manager 130 and a prediction engine training manager 140. Further, as illustrated in FIG. 1, the memory 126 is configured to store various data, which is described with respect to the respective managers that use such data.

The image acquisition manager 130 is configured to receive image training data 131 and reference object data 136. In some implementations, the image acquisition manager 130 receives the image training data 131 and reference object data 136 over the network interface 122, i.e., over a network (such as network 190) from the display device 170. In some implementations, the image acquisition manager 130 receives the image training data 131 and reference object data 136 from local storage (e.g., a disk drive, flash drive, SSD, or the like).

In some implementations, the image acquisition manager 130 is further configured to crop and resize facial images from image training data 131 to produce portraits in a standard size. By cropping and resizing the images to a standard size, the training of the ML system is made more robust.

The image training data 131 represents a set of portraits of faces photographed with various lighting arrangements. In some implementations, the image training data 131 includes images of faces, or portraits, formed with HDR illumination recovered from low-dynamic range (LDR) lighting environment capture. As shown in FIG. 1, the image training data 131 includes multiple images 132(1), . . . 132(M), where M is the number of images in the image training data 131. Each image, say, image 132(1) includes light direction data 134(1) and pose data 135(1).

The light direction data 134(1 . . . M) represents one of a specified number of directions (e.g., 331) from which a face is illuminated for a portrait used in the image training data 131. In some implementations, the light direction data 134(1) includes a polar angle and an azimuthal angle, i.e., coordinates on a unit sphere. In some implementations, the light direction data 134(1) includes a triplet of direction cosines. In some implementations, the light direction data 134(1) includes a set of Euler angles. In an example described above and, in some implementations, the angular configuration represented by the light direction data 134(1) is one of 331 configurations used to train the ML system.

The pose data 135(1 . . . M) represents one of a number (e.g., 9) of specified poses in which the image of a face is captured. In some implementations, a pose includes a facial expression. In some implementations, there are a fixed number of facial expressions (e.g., 3, 6, 9, 12, or higher).

A four-dimensional reflectance field $R(\theta,\phi,x,y)$ may represent a subject lit from any lighting direction $(\theta,\phi)$ for each image pixel $(x,y)$, according to the light direction data 134(1 . . . M). It has been demonstrated that taking a dot product of this reflectance field with an HDR lighting environment similarly parameterized by $(\theta,\phi)$ relights the subject to appear as they would in that scene. To photograph a subject's reflectance field, a computer-controllable sphere of white LED light sources is used with lights spaced 12° apart at the equator. In such implementations, the reflectance field is formed from a set of reflectance basis images, photographing the subject as each of the directional LED light sources is individually turned on one-at-a-time within the spherical rig. In some implementations, these One-Light-at-a-Time (OLAT) images are captured for multiple camera viewpoints. In some implementations, 331 OLAT images are captured for each subject using six color machine vision cameras with 12-megapixel resolution, placed 1.7 meters from the subject, although these values and number of OLAT images and types of cameras used may differ in some implementations. In some implementations, cameras are positioned roughly in front of the subject, with five cameras with 35 mm lenses capturing the upper body of the subject from different angles, and one additional camera with a 50 mm lens capturing a close-up image of the face with tighter framing.

In some implementations, reflectance fields for 70 diverse subjects, each performing nine different facial expressions according to the pose data 135(1 . . . M) and wearing different accessories, yielding about 630 sets of OLAT sequences from six different camera viewpoints, for a total of 3780 unique OLAT sequences. Other quantities of sets of OLAT sequences may be used. Subjects spanning a wide range of skin pigmentations were photographed.

As acquiring a full OLAT sequence for a subject takes some time, e.g., around six seconds, there may be some slight subject motion from frame-to-frame. In some implementations, an optical flow technique is used to align the images, interspersing occasionally (e.g., at every 11th OLAT frame) one extra "tracking" frame with even, consistent illumination to ensure the brightness constancy constraint for optical flow is met. This step may preserve the sharpness of image features when performing the relighting operation, which linearly combines aligned OLAT images.

To relight subjects with photographed reflectance fields, in some implementations, a large database of HDR lighting environments is used in which no light sources are clipped. While there are a few such datasets containing on the order of thousands of indoor panoramas or the upper hemisphere of outdoor panoramas, deep learning models are typically enhanced with a greater volume of training data. Thus, on the order of 1 million indoor and outdoor lighting environments were collected. In some implementations, a mobile phone capture rig is used such that automatically-exposed and white-balanced LDR videos of high-resolution background imagery along with the corresponding LDR appearance of three spheres of different reflectivities (diffuse, mirror-like, and matte silver with rough specular reflections)

could be simultaneously captured. These three spheres reveal different cues about the scene illumination. The mirror ball reflects omnidirectional high frequency lighting, but as bright light sources are often clipped in a single exposure image, their intensity and color will be incorrect. The near-Lambertian BRDF of the diffuse ball, in contrast, acts as a low-pass filter on the incident illumination, capturing a blurred but relatively complete record of total scene radiance.

The implementations herein can have a true HDR record of the scene illumination to use for relighting subjects after explicitly promoting the three sphere appearances into an approximate HDR lighting environment.

The reference object data 136 represents reference objects, e.g., the spheres of different reflectivities. Such reference objects are used to provide ground truth illumination in the ML system. As shown in FIG. 1, the reference object data 136 includes a plurality of reference sets 137(1), . . . , 137(N), where N is the number of HDR lighting environments considered. Each of the reference sets 137(1 . . . N), e.g., reference set 137(1), includes BRDF data for a mirror 138(1), matte silver 139(1), and diffuse gray 141(1). In some implementations, the BRDF data 138(1), 139(1), and 141(1) includes an array of BRDF values. In some implementations, the BRDF data 138(1), 139(1), and 141(1) includes a set of coefficients of a SH expansion.

To train a model for estimating lighting from the image training data 131 in a supervised manner, in some implementations, the portraits represented by the image training data 131 are labeled with ground truth illumination, e.g., the reference object data 136. In some implementations, portraits using the data-driven technique of image-based relighting are synthesized, shown in some cases to produce photo-realistic relighting results for human faces, appropriately capturing complex light transport phenomena for human skin and hair e.g. sub-surface and asperity scattering and Fresnel reflections. Such a synthesis contrasts with renderings of 3D models of faces, which often fail to represent these complex phenomena.

The prediction engine training manager 140 is configured to generate prediction engine data 150, which represents the above-described ML system used to estimate lighting from a portrait. As shown in FIG. 1, the prediction engine training manager 140 includes an encoder 142, a decoder 143, and a discriminator 144.

The encoder 142 is configured to take as input cropped portraits (i.e., from images 132(1 . . . M) and light direction data 134(1 . . . L) from the image training data 131 to produce parametric values in a fully connected layer to be input into the decoder 143. The decoder 143 is configured to take as input the parametric values produced by the encoder 142 and produce illumination profile data 153 representing a predicted HDR lighting estimate. The discriminator 144 is configured to take as input illumination profile data 153 and reference object data 136 and produce cost function data 154 that are fed back into the decoder 143 to produce convolutional layer data 151 and blur pooling data 152. It is noted that a cost function as used in the ML system is a function to be minimized by the ML system. The cost function in this case reflects, e.g., a difference between ground truth sphere images for multiple BRDFs and the corresponding network-rendered spheres lit with predicted illumination. Further details about the ML system are described with regard to FIG. 3.

Returning to the reference object data 136, given captured images of the three reflective spheres, possibly with clipped pixels, some implementations solve for HDR lighting that could have plausibly produced these three sphere appearances. In some implementations, one can first photograph the reflectance field for the diffuse and matte silver ball, again using the light stage system. Some implementations convert the reflectance basis images into the same relative radiometric space, normalizing based on the incident light source color. Some implementations then project the reflectance basis images into the mirror ball mapping (Lambert azimuthal equal-area projection), accumulating energy from the input images for each new lighting direction $(\theta,\phi)$ on a, e.g., 32×32 image of a mirror sphere as in some implementations, forming the reflectance field $R(\theta,\phi,x,y)$, or, sliced into individual pixels, $R_{x,y}(\theta,\phi)$.

For lighting directions $(\theta,\phi)$ in the captured mirror ball image without clipping for color channel c, some implementations recover the scene lighting $L_c(\theta,\phi)$ by simply scaling the mirror ball image pixel values by the inverse of the measured mirror ball reflectivity (82.7%). For lighting directions $(\theta,\phi)$ with clipped pixels in the original mirror ball image, some implementations set the pixel values to 1.0, scale this by an inverse of the measured reflectivity forming the scene lighting $L_c(\theta,\phi)$, and subsequently solve for a residual missing lighting intensity $U_c(\theta,\phi)$ using a non-negative least squares solver formulation. Given an original image pixel value $p_{x,y,c,k}$ for BRDF index k (e.g. diffuse or matte silver), color channel c, and the measured reflectance field $R_{x,y,c,k}(\theta,\phi)$, due to the superposition principle of light, the following equation is satisfied:

$$p_{x,y,c,k} = \sum_{\theta,\phi} R_{x,y,c,k}(\theta,\phi)[L_c(\theta,\phi) + U_c(\theta,\phi)] \qquad \#(1)$$

Eq. (1) represents a set of m linear equations for each BRDF k and color channel c, equal to the number of sphere pixels in the reflectance basis images, with n unknown residual light intensities. For lighting directions without clipping, $U_c(\theta,\phi)=0$. For each color channel, with km>n, the unknown $U_c(\theta,\phi)$ values can be solved for using non-negative least squares, ensuring light is only added, not removed. In practice, some implementations exclude clipped pixels $p_{x,y,c,k}$ from the solve. Some methods have recovered clipped light source intensities by comparing the pixel values from a photographed diffuse sphere with the diffuse convolution of a clipped panorama, but these implementations are the first to use photographed reflectance bases and multiple BRDFs.

In some implementations, it is observed when treating each color channel independently in solving for $U_c(\theta,\phi)$, brightly-hued red, green, and blue light sources were produced, often at geometrically-nearby lighting directions, rather than a single light source with greater intensity in all three colors channels. To recover results with more plausible, neutrally-colored light sources, some implementations add a cross color channel regularization based on the insight that the color of the photographed diffuse grey ball reveals the average color balance $(R_{avg}, G_{avg}, B_{avg})$ of the bright light sources in the scene. Some implementations add to the system of equations a new set of linear equations with weight $\lambda=0.5$:

$$\frac{[L_{c=R}(\theta,\phi) + U_{c=R}(\theta,\phi)]}{[L_{c=G}(\theta,\phi) + U_{c=G}(\theta,\phi)]} = \frac{R_{avg}}{G_{avg}} \qquad \#(2)$$

-continued $$\frac{[L_{c=R}(\theta, \phi) + U_{c=R}(\theta, \phi)]}{[L_{c=B}(\theta, \phi) + U_{c=B}(\theta, \phi)]} = \frac{R_{avg}}{B_{avg}} \quad \#(3)$$

These regularization terms penalize the recovery of strongly hued light sources of a different color balance than the target diffuse ball. Some implementations add a regularization term to encourage similar intensities for geometrically nearby lighting directions, although this would not necessarily prevent the recovery of strongly hued lights. Some implementations recover $U_c(\theta,\phi)$ using a Ceres solver, promoting the one million captured sphere appearances to HDR illumination. As the LDR images from this video-rate data collection method are 8-bit and encoded as sRGB, possibly with local pigmentation-mapping, some implementations first linearize the sphere images assuming a gamma value of $\gamma=2.2$, as included for the linear system formulation.

Using the photographed reflectance fields for each subject and the HDR-promoted lighting, some implementations generate relit portraits with ground truth illumination to serve as training data. Some implementations again convert the reflectance basis images into the same relative radiometric space, calibrating based on the incident light source color. As the lighting environments are represented as, e.g., 32×32 mirror ball images, some implementations project the reflectance fields onto this basis, again accumulating energy from the input images for each new lighting direction $(\theta,\phi)$ as in some implementations. Each new basis image is a linear combination of the original 331 OLAT images.

The lighting capture technique also yields a high-resolution background image corresponding to the three sphere appearances. Since even arbitrary images contain useful cues for extracting lighting estimates, some implementations composite relit subjects onto the backgrounds rather than onto a black frame as in some implementations. Since the background images may be 8-bit sRGB, some implementations clip and apply this transfer function to the relit subject images prior to compositing. As in-the-wild portraits are likely to contain clipped pixels (especially for 8-bit live video for mobile AR), some implementations discard HDR data for the relit subjects to match the expected inference-time inputs.

Although background imagery may provide contextual cues that aid in lighting estimation, some implementations compute a face bounding box for each input, and during training and inference some implementations crop each image, expanding the bounding box by 25%. During training some implementations add slight crop region variations, randomly changing their position and extent.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1, including combining functionality illustrated as two components into a single component.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the computer 120 can be, or can include, processors configured to process instructions stored in a memory. For example, an image acquisition manager 130 (and/or a portion thereof) and a prediction image training manager 140 (and/or a portion thereof can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120. As illustrated in FIG. 1, the memory 126 is configured to store various data, including image training data 131, reference object data 136 and prediction engine data 150.

Figure 2:
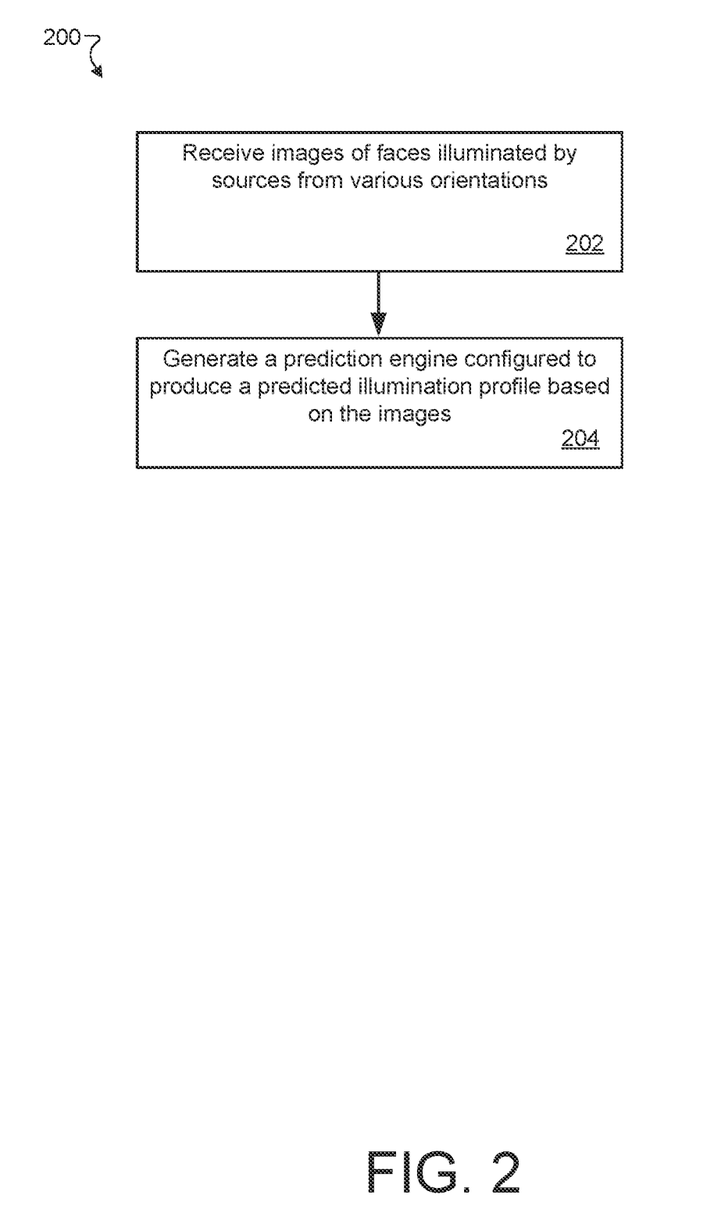
FIG. 2 is a flow chart that illustrates an example method of estimating lighting from a portrait, according to disclosed implementations.

FIG. 2 is a flow chart depicting an example method 200 of performing a visual search according to the above-described improved techniques. The method 200 may be performed by software constructs described in connection with FIG. 1, which reside in memory 126 of the computer 120 and are run by the set of processing units 124.

At 202, the image acquisition manager 130 receives a plurality of images (e.g., image training data 131) of a plurality of human faces in a physical environment. Each of the plurality of human faces is illuminated by at least one of a plurality of illumination sources oriented within the physical environment according to at least one of a plurality orientations (e.g., light direction data 134(1 . . . M)).

At 204, the prediction engine training manager 140 generates a prediction engine (e.g., prediction engine data 150) configured to produce a predicted illumination profile based on the plurality of images of the plurality of human faces. The prediction engine is configured to produce a predicted illumination profile based on input image data. The input image data represents at least one human face. The prediction engine includes a cost function (e.g., discriminator 144 and cost function data 154) that is based on a plurality of bidirectional reflection distribution functions (BRDFs) corresponding to each of the reference objects (e.g., reference object data 136). A predicted illumination profile represents a spatial distribution of illumination incident on a subject of a portrait. An example representation of a predicted illumination includes coefficients of a spherical harmonic expansion of a lighting function of angle. Another example representation of a predicted illumination includes a grid of pixels, each having a value of the lighting function of solid angle.

Figure 3:
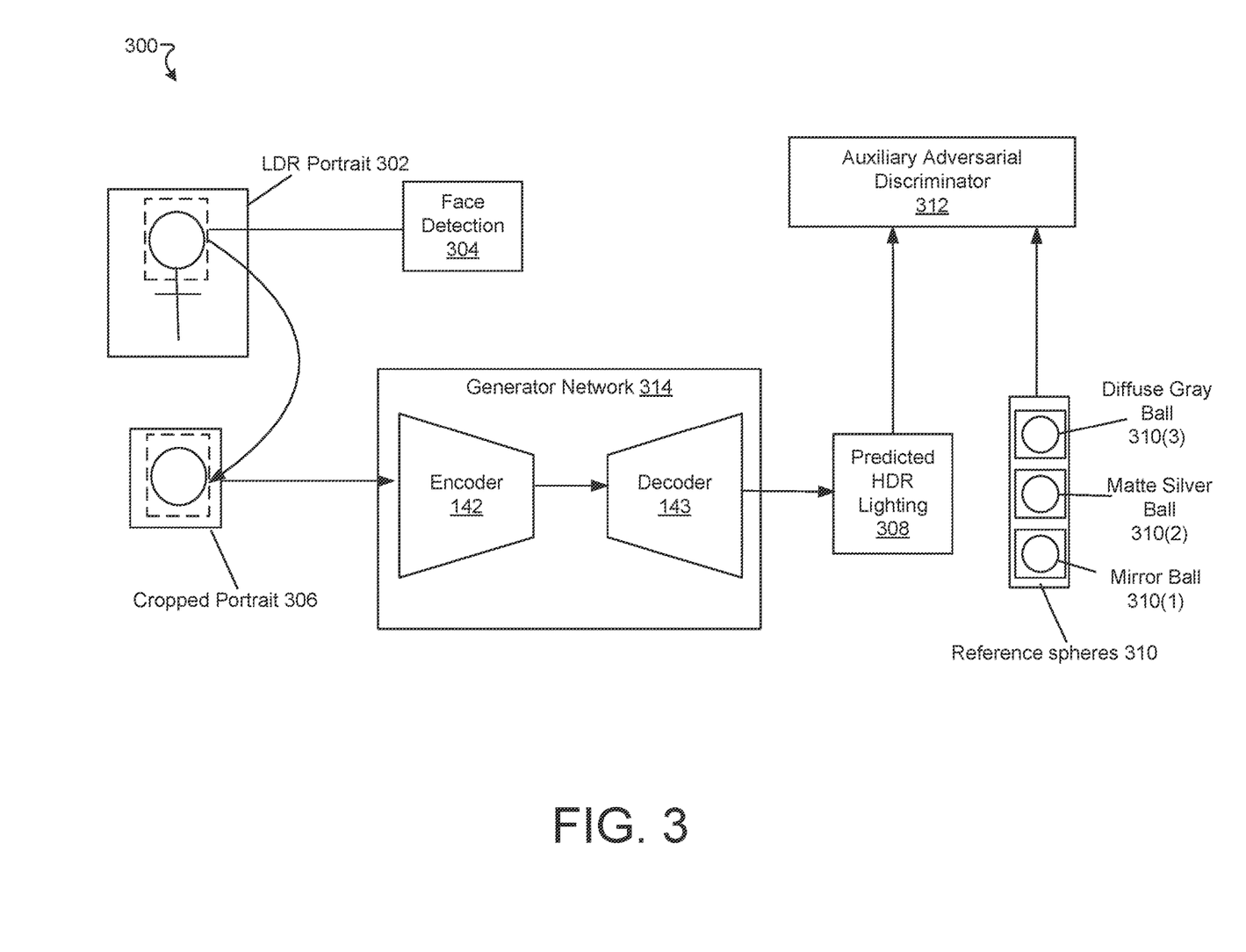
FIG. 3 is a diagram that illustrates an example system configured to estimate lighting from a portrait, according to disclosed implementations.

FIG. 3 is a diagram that illustrates an example ML system 300 configured to estimate lighting from a portrait. As shown in FIG. 3, the ML system 300 includes a generator network 314 and an auxiliary adversarial discriminator 312. The input to the generator network 314 is an sRGB encoded LDR image, e.g., an LDR portrait 302, with the crop 306 of the face region of each image detected by face detector 304, resized to an input resolution of 256×256, and normalized to the range of [−0.5,0.5]. As shown in FIG. 3, the generator network 314 has an encoder/decoder architecture including the encoder 142 and the decoder 143 with a latent vector representation of log-space HDR illumination of size 1024 at the bottleneck. In some implementations, the encoder 142 and the decoder 143 are implemented as convolutional neural networks (CNNs). The final output of the generator network 314 includes a 32×32 HDR image of a mirror ball representing log-space omnidirectional illumination. Further details about the encoder 142 and decoder 143 are shown with regard to FIG. 4; further details about the auxiliary adversarial discriminator 312 are shown with regard to FIG. 5.

Figure 4:
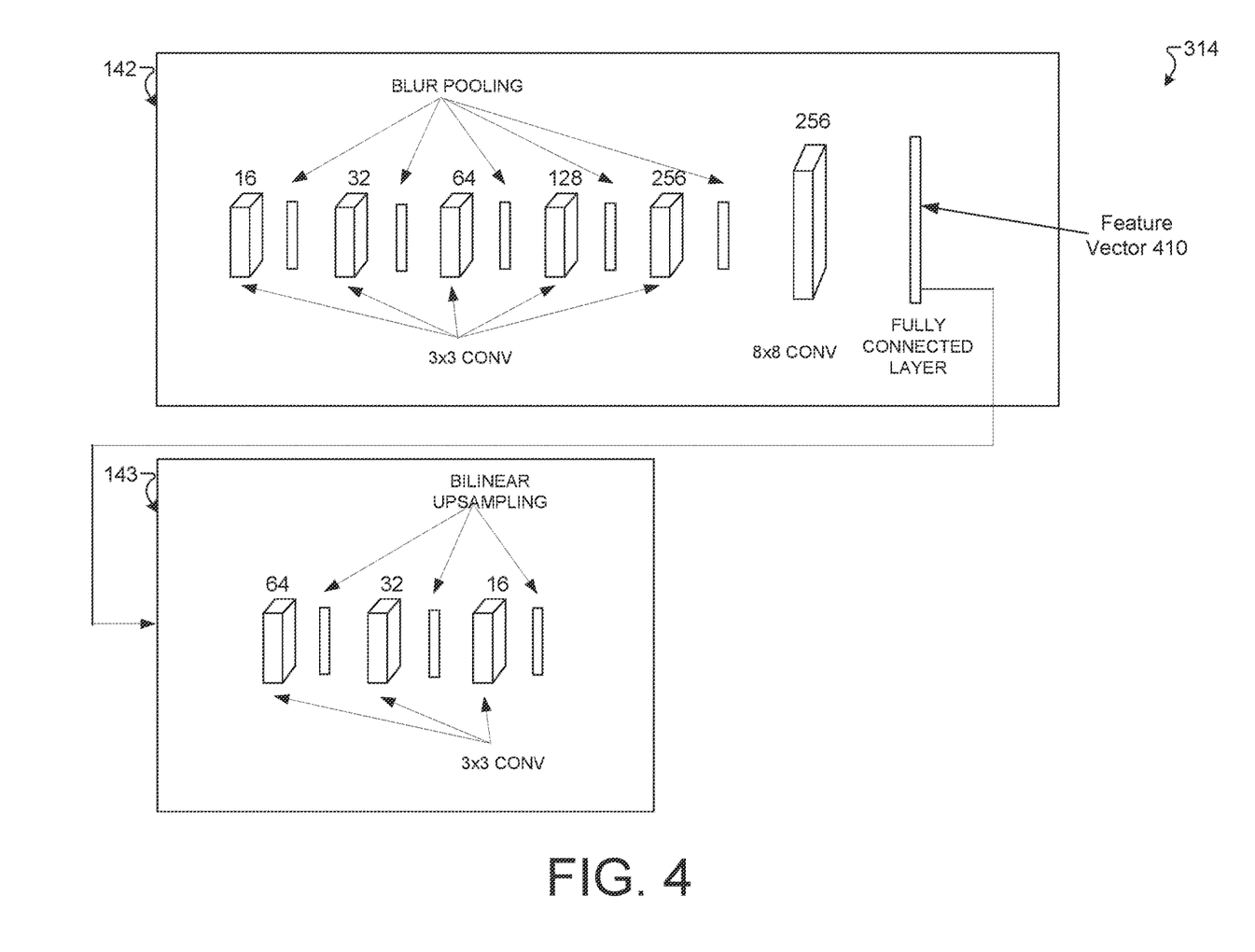
FIG. 4 is a diagram that illustrates an example convolutional neural network (CNN) within the example system illustrated in FIG. 3.

FIG. 4 is a diagram that illustrates example detail for the encoder 142 and decoder 143. As shown in FIG. 4, the encoder 142 includes five 3×3 convolutions each followed by a blur-pooling operation, with successive filter depths of 16, 32, 64, 128, and 256, followed by one last convolution with a filter size of 8×8 and depth 256, and finally a fully-connected layer. The decoder 143 includes three sets of 3×3 convolutions of filter depths 64, 32, and 16, each followed by a bilinear-upsampling operation.

Figure 5:
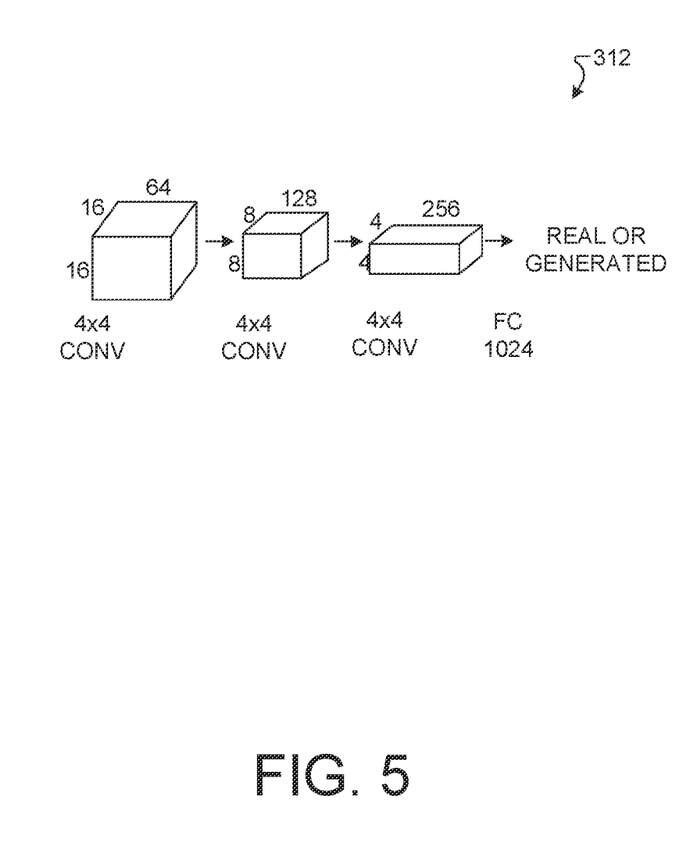
FIG. 5 is a diagram that illustrates an example discriminator within the example system illustrated in FIG. 3.

FIG. 5 is a diagram that illustrates an example auxiliary adversarial discriminator 312. The auxiliary adversarial discriminator 312 is configured to provide an adversarial loss term, enforcing estimation of plausible high frequency illumination. As shown in FIG. 5, the auxiliary adversarial discriminator 312 takes as input clipped images of ground truth and predicted illumination from the main model and tries to discriminate between the real and generated examples. The discriminator has an encoder that includes three 3×3 convolutions each followed by a max-pooling operation, with successive filter depths of 64, 128, and 256, followed by a fully connected layer of size 1024 before the final output layer. As the main network's decoder includes several upsampling operations, the network is implicitly learning information at multiple scales. Some implementations leverage this multi-scale output to provide inputs to the discriminator not just of the full-resolution 32×32 clipped lighting image, but also of a lighting image at each scale: 4×4, 8×8, and 16×16, using the multi-scale gradient technique of MSG-GAN. As the lower-resolution feature maps produced by the generator network have more than 3 channels, some implementations add a convolution operation at each scale as extra branches of the network, producing multiple scales of 3-channel lighting images to supply to the discriminator.

Returning to FIG. 3, the generator network 314 and the auxiliary adversarial discriminator 312 employ various cost functions to build the prediction engines and discriminate between real and generated lighting estimates. Some implementations describe a differentiable image-based relighting rendering loss, used for training a network to estimate HDR lighting 308 $\hat{L}$ from an unconstrained image. This approach minimizes the reconstruction loss between the ground truth sphere images I for multiple BRDFs and the corresponding network-rendered spheres $\hat{I}$, lit with the predicted illumination. Some implementations use this technique to train this model for inverse lighting from portraits, relying on these sphere renderings to learn illumination useful for rendering virtual objects of a variety of BRDFs. Some implementations produce sphere renderings $\hat{I}$ in-network using image-based relighting and photographed reflectance fields for each sphere 310 of BRDF index k (mirror 310(1), matte silver 310(2), or diffuse 310(3)), and color channel c, with $\hat{L}_c(\theta,\phi)$ as the intensity of light for the direction $(\theta,\phi)$:

$$\hat{I}_{x,y,k,c} = \sum_{\theta,\phi} R_{x,y,k,c}(\theta, \phi)\hat{L}_c(\theta, \phi). \quad \#(4)$$

As in some implementations, this network similarly outputs a log space image Q of HDR illumination, with pixel values $Q_c(\theta,\phi)$, so sphere images are rendered as $$\hat{I}_{x,y,k,c} = \sum_{\theta,\phi} R_{x,y,k,c}(\theta, \phi)e^{Q_c(\theta,\phi)}. \quad \#(5)$$

With binary mask $\hat{M}$ to mask out the corners of each sphere, $\gamma=2.2$ for gamma-encoding, $\lambda_k$ as an optional weight for each BRDF, and a differentiable soft-clipping function $\Lambda$ as in some implementations, the final LDR image reconstruction loss $L_{rec}$ comparing ground truth images $I_k$ and network-rendered images $\hat{I}_k$ is $$L_{rec} = \sum_{k=0}^{2} \lambda_k \left\| \hat{M} \odot \left(\Lambda(\hat{I}_k)^{\frac{1}{\gamma}} - \Lambda(I_k)\right) \right\|_1. \quad (6)$$

where the binary operator $\odot$ represents element-by-element multiplication.

Rather than use the LDR sphere images captured in the video-rate data collection as the reference images $I_k$, some implementations instead render the spheres with the HDR lighting recovered from a linear solver (e.g., Eq. (1)), gamma-encoding the renderings with $\gamma=2.2$. This can ensure that the same lighting is used to render the "ground truth" spheres as the input portraits, preventing the propagation of residual error from the HDR lighting recovery to the model training phase.

Some implementations finally add extra convolution branches to convert the multi-scale feature maps of the decoder into 3-channel images representing log-space HDR lighting at successive scales. Some implementations then extend the rendering loss function of some implementations (Eq. (6)) to the multi-scale domain, rendering mirror, matte silver, and diffuse spheres during training in sizes 4×4, 8×8, 16×16, and 32×32. With scale index represented by s, and an optional weight for each as $\lambda_s$, the multi-scale image reconstruction loss is written as $$L_{ms-rec} = \sum_{s=0}^{3}\sum_{k=0}^{2}\lambda_s\lambda_k\|\hat{M}\odot(\Lambda(\hat{I}_k)^{\frac{1}{\gamma}}-\Lambda(I_k))\|_1. \quad (7)$$

Recent work in unconstrained lighting estimation has shown that adversarial loss terms improve the recovery of high-frequency information compared with using only image reconstruction losses. Thus, some implementations add an adversarial loss term with weight $\lambda_{adv}$ as in some implementations. However, in contrast to this technique, some implementations use a multi-scale GAN architecture that flows gradients from the discriminator to the generator network at multiple scales, providing the discriminator with different sizes of both real and generated clipped mirror ball images.

Some implementations use Tensorflow and the ADAM optimizer with $\beta_1=0.9$, $\beta_2=0.999$, a learning rate of 0.00015 for the generator network, and, as is common, one 100× lower for the discriminator network, alternating between training the generator and discriminator. Some implementations set $\lambda_k=0.2,0.6,0.2$ for the mirror, diffuse, and matte silver BRDFs respectively, set $\lambda_s=1$ to weight all image scales equally, set $\lambda_{adv}=0.004$, and use a batch size of 32. As the number of lighting environments may be orders of magnitude larger than the number of subjects, early stopping at 1.2 epochs prevented over-fitting to subjects in the training set for some implementations. Some implementations use the ReLU activation function for the generator network and the ELU activation function for the discriminator. To augment the dataset, some implementations flip both the input images and lighting environments across the vertical axis. Some implementations augment the dataset with slight image rotations (+/−15 degrees) of the input images in the image plane.

Some implementations split 70 subjects into two groups: 63 for training and 7 for evaluation, ensuring that all expressions and camera views for a given subject belong to the same subset. Some implementations include manually selecting the 7 subjects to include various skin pigmentations. In total, for each of the 1 million lighting environments, some implementations include randomly selecting 8 OLAT sequences to relight from the training set (across subjects, facial expressions, and camera views), generating a training dataset of 8 million portraits with ground truth illumination. Using the same method, some implementations capture lighting environments in both indoor and outdoor locations unseen in training to use for the evaluation, pairing these only with the evaluation subjects.

Accurately estimated lighting should correctly render objects with arbitrary reflectance properties, so the model's performance is tested using $L_{rec}$. This metric compares the appearance of three spheres (diffuse, matte silver, and mirror) as rendered with the ground truth versus estimated illumination.

For the LDR image reconstruction losses, this model out-performs some implementations for the diffuse and matte silver spheres. However, some implementations can out-perform this implementation for the mirror sphere. A 2nd order SH approximation of the ground truth illumination can out-perform this model for $L_{rec}$ for the diffuse ball, since a low frequency representation of illumination suffices for rendering Lambertian materials. However, this implementation can out-perform the 2nd order SH decomposition for $L_{rec}$ for both the matte silver and mirror balls, with non-Lambertian BRDFs. This suggests that lighting produced by this implementation is better suited for rendering diverse materials.

Some implementations add a cross-subject-consistency-based loss function based on a difference between a first predicted illumination profile from a first human face and a second predicted illumination profile from a second human face. Such a loss function may provide a measure of lighting consistency for diverse skin pigmentations and head poses.

Figure 6:
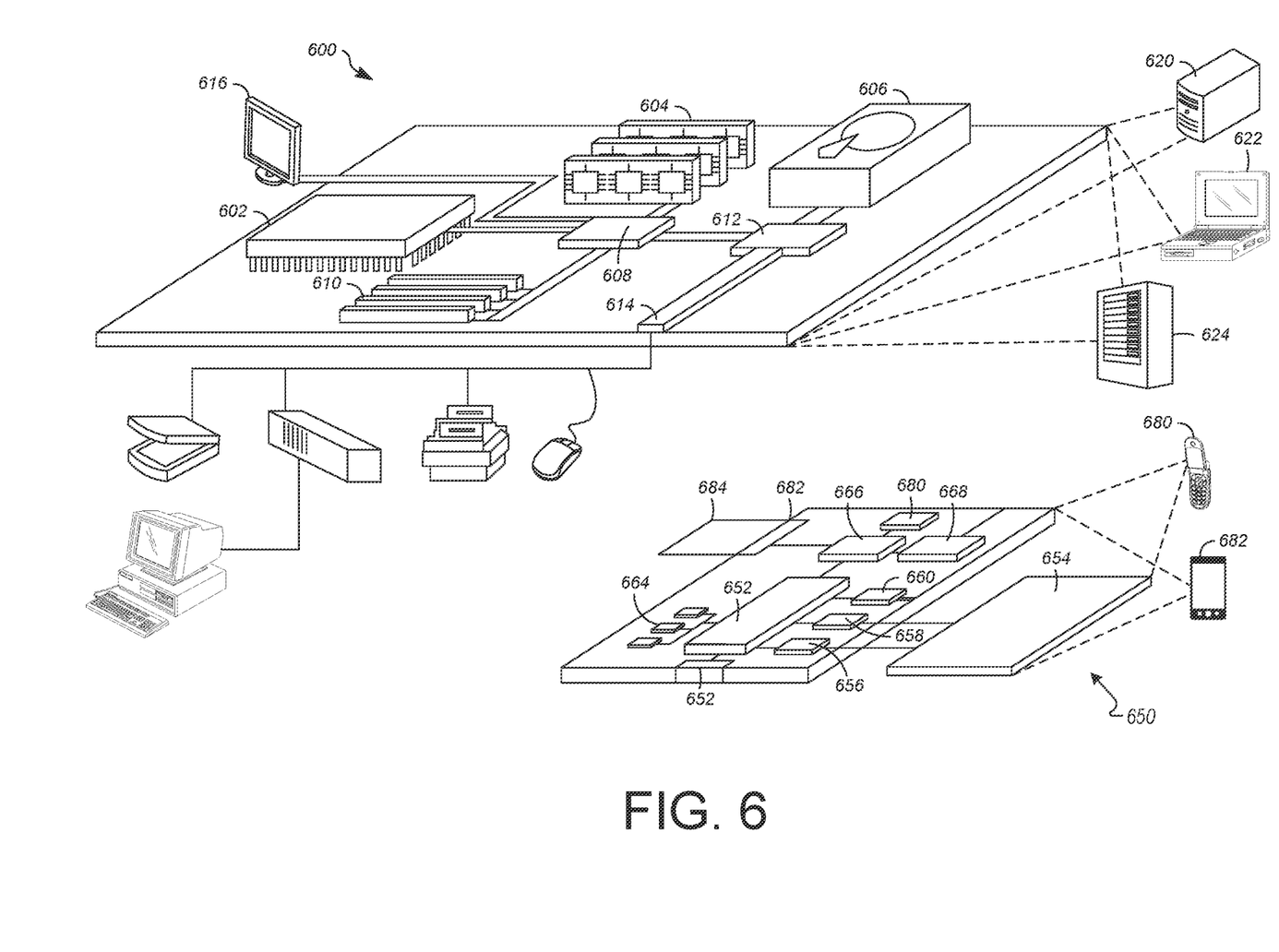
FIG. 6 is a diagram that illustrates an example of a computer device and a mobile computer device that can be used to implement the described techniques.

FIG. 6 illustrates an example of a generic computer device 600 and a generic mobile computer device 650, which may be used with the techniques described here. Computer device 600 is one example configuration of computer 120 of FIG. 1 and FIG. 2.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. In the following some examples are described.

Example 1: A method, comprising:
receiving image training data representing a plurality of images, each of the plurality of images including at least one of a plurality of human faces, each of the plurality of human faces having been formed by combining images of one or more faces as illuminated by at least one of a plurality of illumination sources in a physical or virtual environment, each of the plurality of illuminations sources having been situated at a respective orientation of a plurality of orientations within the physical or virtual environment; and
generating a prediction engine based on the plurality of images, the prediction engine being configured to produce a predicted illumination profile from input image data, the input image data representing one input human face.

Example 2: The method as in example 1, further comprising:
combining the images of the one or more human faces as illuminated by the at least one of a plurality of illumination sources to synthetically render each of the plurality of human faces to appear as illuminated by a high dynamic range (HDR) lighting environment.

Example 3: The method as in claim 2, wherein combining the images includes:
generating the HDR lighting environment based on low dynamic range (LDR) images of a set of reference objects, each of the set of reference objects having a respective bidirectional reflectance distribution function (BRDF).

Example 4: The method as in example 3, wherein the set of reference objects includes a mirror ball, a matte silver ball, and a gray diffuse ball.

Example 5: The method as in example 1, wherein generating the prediction engine includes:
performing a differentiable rendering of a set of reference objects using the predicted illumination profile to produce a rendered image of the set of reference objects, each of the set of reference objects having a respective bidirectional reflectance distribution function (BRDF); and
generating, as a cost function of the prediction engine, a difference between the rendered image of the set of reference objects with a ground truth image of the set of reference objects.

Example 6: The method as in example 5, wherein the cost function includes a BRDF-weighted L1 loss on the rendered image of the set of reference objects.

Example 7: The method as in example 5, wherein the cost function is a first cost function, and
wherein the prediction engine includes a second cost function, the second cost function is an adversarial loss function based on high frequency specular reflections from the mirror ball.

Example 8: The method as in example 5, wherein the differentiable rendering is performed using an image-based relighting (IBRL) to produce high-dynamic range (HDR) illuminated images.

Example 9: The method as in example 5, wherein the cost function is a first cost function, and
wherein the prediction engine includes a second cost function, the second cost function is a cross-subject-consistency-based loss function based on a difference between a first predicted illumination profile from a first human face and a second predicted illumination profile from a second human face.

Example 10: The method as in example 1, wherein generating the prediction engine includes:
performing a facial keypoints detection operation on image training data to produce facial keypoints identifiers identifying facial keypoints during the generation of the prediction engine.

Example 11: The method as in example 1, wherein generating the prediction engine includes:
projecting each pixel of an image of a human face of the plurality of human faces into a common UV space.

Example 12: The method as in example 1, wherein each of the plurality of images are gamma encoded.

Example 13: A computer program product comprising a nontransitory storage medium, the computer program product including code that, when executed by processing circuitry of a computer, causes the processing circuitry to perform a method, the method comprising:
receiving image training data representing a plurality of images, each of the plurality of images including at least one of a plurality of human faces, each of the plurality of human faces having been formed by combining images of one or more faces as illuminated by at least one of a plurality of illumination sources in a physical or virtual environment, each of the plurality of illuminations sources having been situated at a respective orientation of a plurality of orientations within the physical or virtual environment; and
generating a prediction engine based on the plurality of images, the prediction engine being configured to produce a predicted illumination profile from input image data, the input image data representing one input human face.

Example 14: The computer program product as in example 13, wherein generating the prediction engine includes:
combining the images of the one or more human faces as illuminated by the at least one of a plurality of illumination sources to synthetically render each of the plurality of human faces to appear as illuminated by a high dynamic range (HDR) lighting environment.

Example 15: The computer program product as in example 14, wherein combining the images includes:
generating the HDR lighting environment based on low dynamic range (LDR) images of a set of reference objects, each of the set of reference objects having a respective bidirectional reflectance distribution function (BRDF).

Example 16: The computer program product as in example 15, wherein the set of reference objects includes a mirror ball, a matte silver ball, and a gray diffuse ball.

Example 17: The computer program product as in example 13, wherein generating the prediction engine includes:
performing a differentiable rendering of a set of reference objects using the predicted illumination profile to produce a rendered image of the set of reference objects, each of the set of reference objects having a respective bidirectional reflectance distribution function (BRDF); and
generating, as a cost function of the prediction engine, a difference between the rendered image of the set of reference objects with a ground truth image of the set of reference objects.

Example 18: The computer program product as in example 14, wherein the cost function includes a BRDF-weighted L1 loss on the rendered image of the set of reference objects.

Example 19: The computer program product as in example 18, wherein the differentiable rendering is performed using an image-based relighting (IBRL) to produce high-dynamic range (HDR) illuminated images.

Example 20: An electronic apparatus, the electronic apparatus comprising:
memory; and
processing circuitry coupled to the memory, the processing circuitry being configured to:
image training data representing a plurality of images, each of the plurality of images including at least one of a plurality of human faces, each of the plurality of human faces having been formed by combining images of one or more faces as illuminated by at least one of a plurality of illumination sources in a physical or virtual environment, each of the plurality of illuminations sources having been situated at a respective orientation of a plurality of orientations within the physical or virtual environment; and
generate a prediction engine based on the plurality of images, the prediction engine being configured to produce a predicted illumination profile from input image data, the input image data representing one input human face.

What is claimed is:

1. A method, comprising:
receiving an image representation of a first human; and
generating a prediction engine based on the image representation of the first human including producing a rendered image of a reference object and generating a comparison between the rendered image of the reference object and a ground truth image of the rendered image of the reference object, the comparison being based on a weight associated with the reference object, the prediction engine being configured to produce a predicted illumination profile based on an image representation of a second human.

2. The method as in claim 1, further comprising:
synthetically rendering the image representation of the first human to appear as illuminated by a high dynamic range lighting environment.

3. The method as in claim 2, wherein synthetically rendering the image representation of the first human includes:
generating the high dynamic range lighting environment based on a low dynamic range image of the reference object, the reference object having a bidirectional reflectance distribution function.

4. The method as in claim 3, wherein the reference object includes any of a mirror ball, a matte silver ball, or a gray diffuse ball.

5. The method as in claim 1, wherein producing the rendered image of the reference object includes:
performing a differentiable rendering of the reference object using the predicted illumination profile.

6. The method as in claim 1, wherein generating the prediction engine further includes
generating an adversarial loss function based on high frequency specular reflections from a mirror ball.

7. The method as in claim 5, wherein the differentiable rendering is performed using an image-based relighting to produce a high-dynamic range illuminated image.

8. The method as in claim 1, wherein generating the prediction engine further includes
generating a cross-subject-consistency-based loss function based on a difference between a first predicted illumination profile and a second predicted illumination profile.

9. The method as in claim 1, wherein generating the prediction engine includes:
performing a facial keypoint detection operation on image training data to produce a facial keypoint identifier identifying a facial keypoint during the generation of the prediction engine.

10. The method as in claim 1, wherein generating the prediction engine includes:
projecting a pixel of an image of the first human into a common UV space.

11. The method as in claim 1, wherein the image representation of the first human is gamma encoded.

12. A computer program product comprising a nontransitory storage medium, the computer program product including code that, when executed by processing circuitry, causes the processing circuitry to perform a method, the method comprising:
receiving an image representation of a first human; and
generating a prediction engine based on the image representation of the first human including producing a rendered image of a reference object and generating a comparison between the rendered image of the reference object and a ground truth image of the rendered image of the reference object, the comparison being based on a weight associated with the reference object, the prediction engine being configured to produce a predicted illumination profile based on an image representation of a second human.

13. The computer program product as in claim 12, wherein generating the prediction engine includes:
synthetically rendering the image representation of the first human to appear as illuminated by a high dynamic range lighting environment.

14. The computer program product as in claim 13, wherein synthetically rendering the image representation of the first human includes:
generating the high dynamic range lighting environment based on a low dynamic range image of the reference object, the reference object having a bidirectional reflectance distribution function.

15. The computer program product as in claim 14, wherein the reference object includes any of a mirror ball, a matte silver ball, or a gray diffuse ball.

16. The computer program product as in claim 12, wherein producing the rendered image of the reference object includes:
performing a differentiable rendering of the reference object using the predicted illumination profile.

17. The computer program product as in claim 16 wherein the differentiable rendering is performed using an image-based relighting to produce a high-dynamic range illuminated image.

18. An electronic apparatus, the electronic apparatus comprising:
memory; and
controlling circuitry coupled to the memory, the controlling circuitry being configured to:
receive an image representation of a first human; and
generate a prediction engine based on the image representation of the first human including producing a rendered image of a reference object and generating a comparison between the rendered image of the reference object and a ground truth image of the reference object, the comparison being based on a weight associated with the rendered image of the reference object, the prediction engine being configured to produce a predicted illumination profile based on an image representation of a second human.

19. The electronic apparatus as in claim 18, wherein the controlling circuitry is further configured to:
synthetically render the image representation of the first human to appear as illuminated by a high dynamic range lighting environment.

20. The method as in claim 1, wherein generating the prediction engine includes performing a multiplication of the comparison by a binary mask.

21. The method as in claim 1, wherein the prediction engine includes a generator network that is configured to take as input the image representation of the first human and produce as output an image of a mirror ball.

* * * * *